(12) United States Patent  
Abe et al.

(10) Patent No.: US 6,715,924 B2  
(45) Date of Patent: Apr. 6, 2004

(54) ROLLING BEARING (75) Inventors: Shinji Abe, Nara (JP); Atsushi Yao, Kashihara (JP); Tomohiro Haruta, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 70 days.

(21) Appl. No.: 10/200,335

(22) Filed: Jul. 23, 2002

(65) Prior Publication Data

US 2003/0016893 A1 Jan. 23, 2003

(30) Foreign Application Priority Data

Jul. 23, 2001 (JP) ........................................ 2001-221711

(51) Int. Cl.$^7$ ............................................... F16C 33/58
(52) U.S. Cl. ...................................................... 384/516
(58) Field of Search ................................. 384/450, 513, 384/516

(56) References Cited

U.S. PATENT DOCUMENTS 6,474,871 B2 * 11/2002 Yajima et al. ............... 384/490
2001/0028754 A1 * 10/2001 Ishiguro et al. ............. 384/516

FOREIGN PATENT DOCUMENTS

JP      10-246239      9/1998
JP      2000-179556      6/2000

* cited by examiner

Primary Examiner—Thomas R. Hannon
(74) Attorney, Agent, or Firm—Smith, Gambrell & Russell, LLP (57) ABSTRACT Within bounds on both sides of an axial center of each of the raceways of an outer and inner ring, a curvature radius of a raceway portion in a dimensional range covering at least 45% of a raceway width with respect to the axial center thereof is defined to be within the range of between ±1 μm to/from a mean curvature radius of the raceway in the dimensional range.

3 Claims, 7 Drawing Sheets

ROLLING BEARING

BACKGROUND OF THE INVENTION

The present invention relates to a ball bearing for use in a hard disc apparatus for supporting, for example, a rotary member of a spindle motor or supporting a rotary member in a pivot section of a magnetic head in the apparatus.

Conventionally, the hard disc apparatus is provided with the spindle motor for high speed rotation of a magnetic disc as a magnetic recording medium. The apparatus employs a ball bearing for supporting a hub which is the rotary member of the spindle motor. Unfortunately, if a natural frequency of the ball bearing matches a natural frequency of a component other than the ball bearing, there may occur resonance therebetween which will cause abnormal vibrations interfering with writing data to or reading data from the magnetic disc. Accordingly, it is a general practice to change materials for or shapes of the individual components for differentiating the natural frequency of the ball bearing from those of the other components, thereby avoiding the occurrence of resonance therebetween.

However, the natural frequencies of the ball bearings vary greatly from one bearing product to another and so are the mean values thereof. Therefore, it is actually difficult to differentiate the natural frequencies of the other components from those of all the conceivable ball bearings. Thus, there is a problem of inability to effectively prevent the occurrence of resonance. Such a problem is encountered not only by the ball bearing of the spindle motor but also by the ball bearing disposed in the pivot section of the magnetic head assembly.

SUMMARY OF THE INVENTION

A ball bearing according to the invention comprises: an outer ring having a raceway; an inner ring disposed in the outer ring in concentric relation therewith and having a raceway opposing the raceway of the outer ring; and a plurality of balls interposed between the raceways of the outer and inner rings, wherein within bounds on both sides of an axial center of each of the raceways of the outer and inner rings, a curvature radius of a raceway portion in a dimensional range covering at least 45% of a raceway width with respect to the axial center is within the range of between ±1 μm to/from a mean curvature radius of the raceway in the dimensional range.

According to the ball bearing of such a configuration, the natural frequencies and the mean values thereof are prevented from greatly varying from one product to another. Specifically, the present inventors have made intensive study on the causes of the product-by-product great variations in the natural frequency of the ball bearing and in the mean value of the natural frequencies thereof, to find that minor shape irregularities produced on the raceways of the inner and outer rings substantially affect such variations. The inventors discovered that if the curvature radius of the raceway portion at least in the aforesaid dimensional range is limited within the range of between ±1 μm to/from the mean curvature radius thereof, the ball bearings are prevented from suffering the product-by-product great variations in the natural frequency and the mean value thereof. Thus, the inventors have achieved the invention based on this discovery.

According to the inventive ball bearing, the product-by-product great variations in the natural frequency and the mean value thereof are prevented and hence, it is easy to estimate the natural frequency and the mean value thereof.

Thus, it becomes easier to design and fabricate the apparatus with the aim of differentiating the natural frequency of the bearing assembled in the apparatus from the natural frequencies of the other components of the apparatus. As a result, the occurrence of resonance between the bearing assembled in the apparatus and the other components thereof is effectively prevented.

DETAILED DESCRIPTION OF THE PREFERRED EMBODIMENT

The invention will hereinbelow be described in detail with reference to the accompanying drawings illustrating a preferred embodiment thereof.

Figure 1:
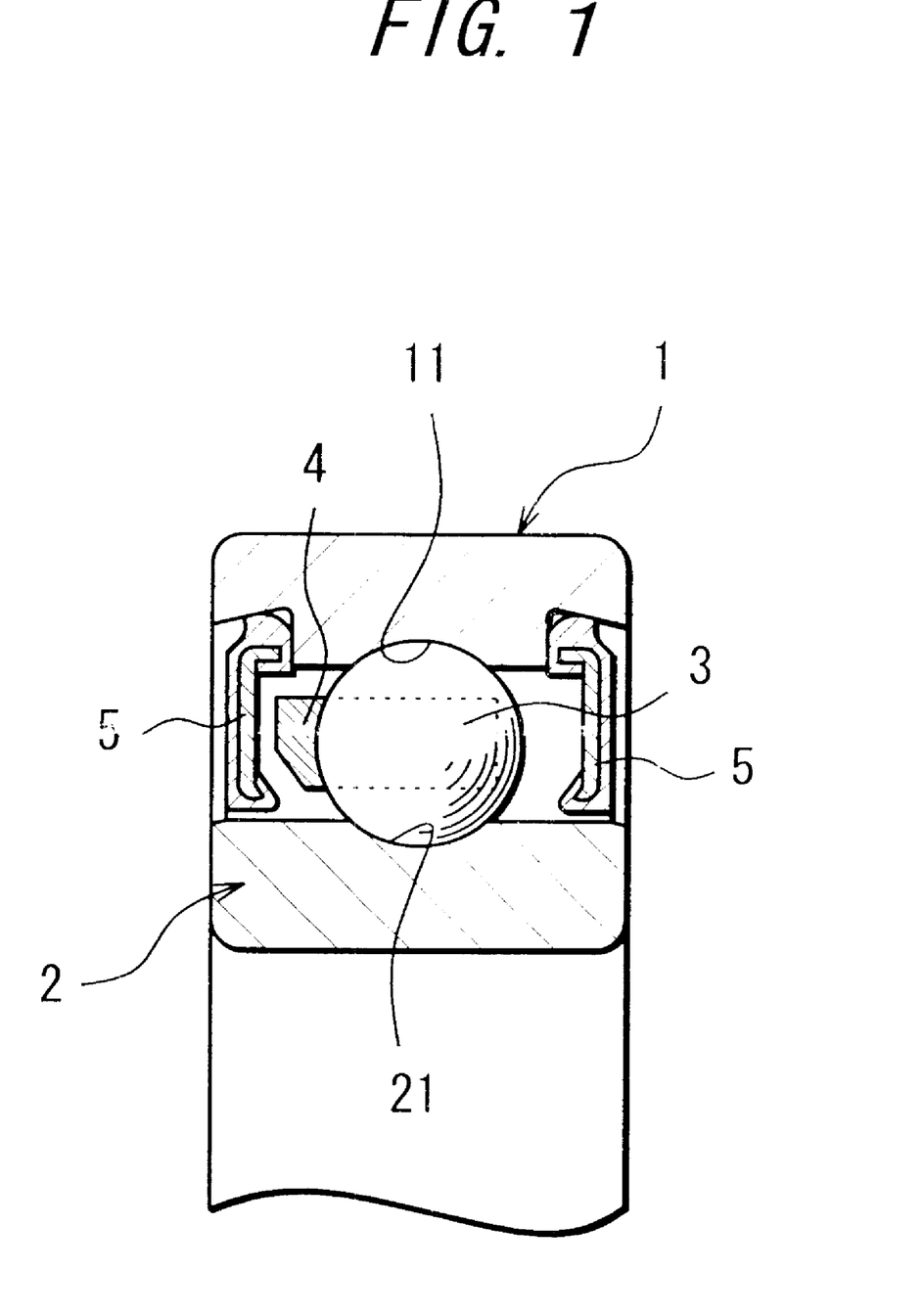
FIG. 1 is a sectional view showing a principal portion of a ball bearing according to one embodiment of the invention.

FIG. 1 is a sectional view showing a principal portion of a ball bearing according to one embodiment of the invention. The ball bearing rotatably supports a hub of a spindle motor in a hard disc apparatus and has an arrangement wherein a plurality of balls 3 are interposed between a raceway 11 defined by an inside circumference of an outer ring 1 and a raceway 21 defined by an outside circumference of an inner ring 2, as retained by a cage 4 at places at equal circumferential space intervals and wherein an annular opening between the inside circumference of the outer ring 1 and the outside circumference of the inner ring 2 is hermetically sealed with a seal 5.

Figure 2:
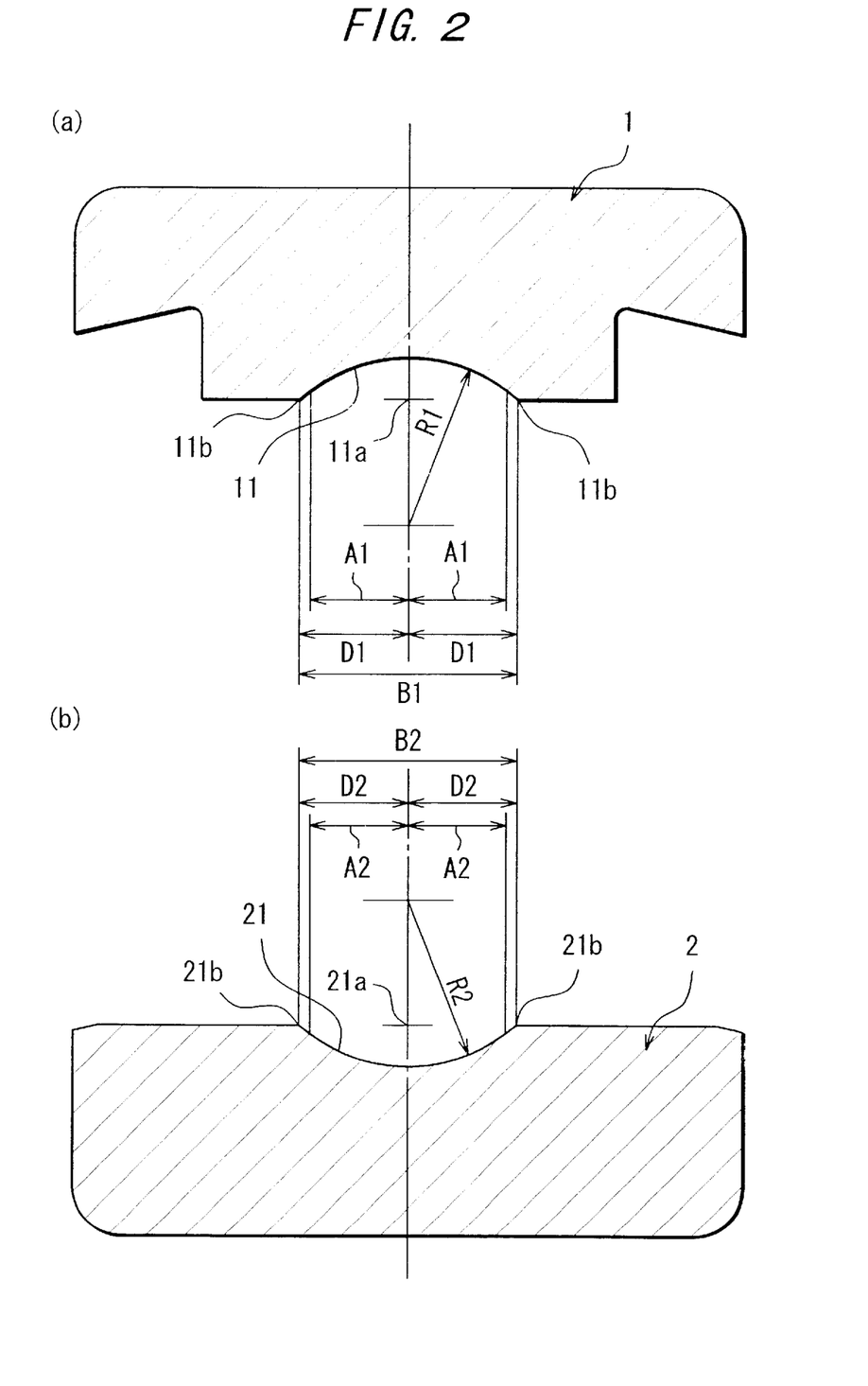
FIG. 2 is an enlarged sectional view showing raceway portions of an inner and outer ring.
Figure 3:
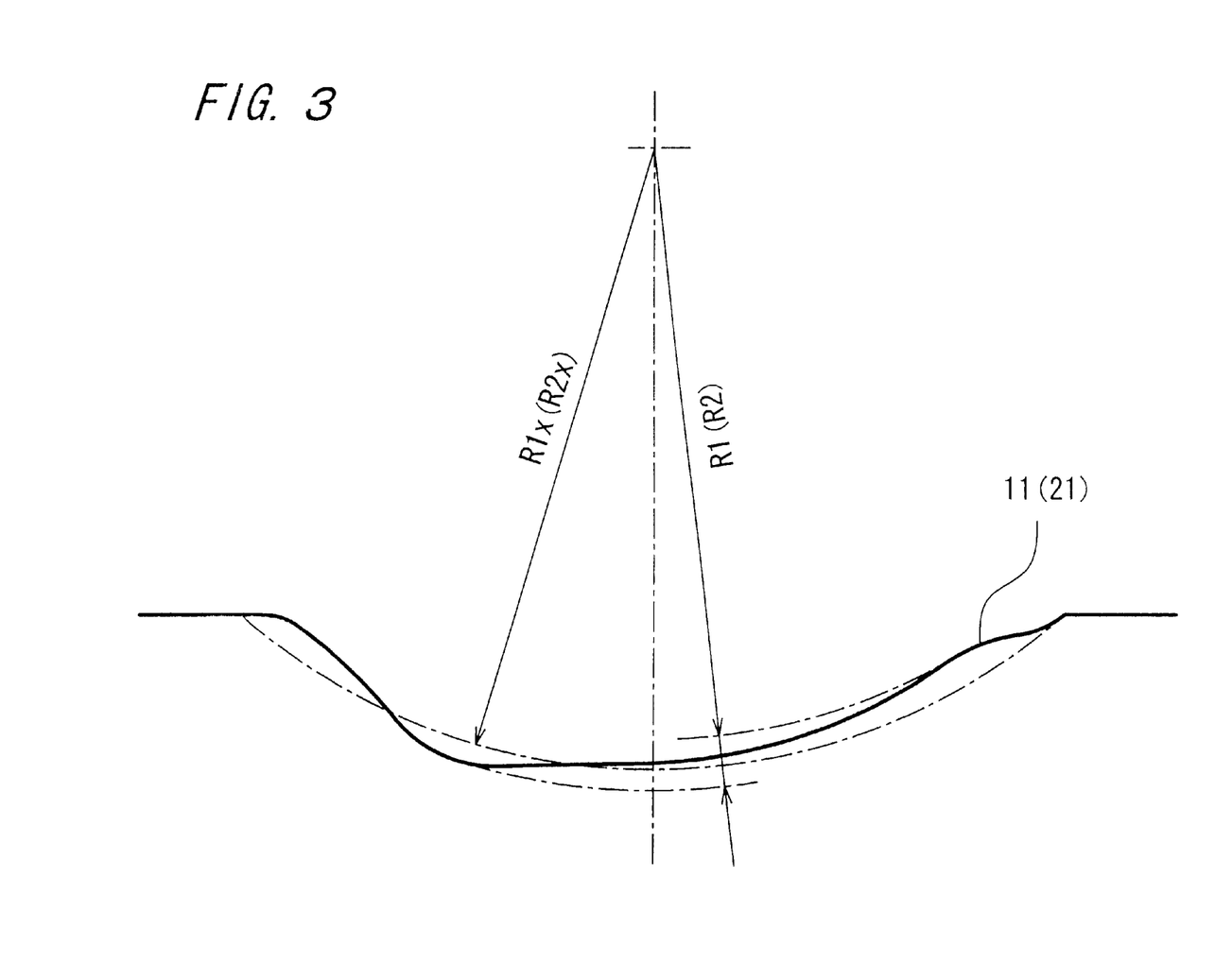
FIG. 3 is a schematic diagram showing a raceway of the inner or outer ring.

Referring to FIGS. 2 and 3, the raceway 11 of the outer ring 1 is worked in a manner that a curvature radius R1 of the raceway 11 in given dimensional ranges A1 on both sides of an axial center 11a of the raceway is limited within the range of between ±1 μm to/from a mean curvature radius $R1_x$ of the raceway 11 in the dimensional ranges A1. It is noted here that the predetermined dimensional range A1 is defined as a range covering at least 90% of a distance D1 between the axial center 11a of the raceway 11 and a raceway shoulder 11b, or a range covering at least 45% of a raceway width B1 with respect to the axial center 11a of the raceway 11. On the other hand, the raceway 21 of the inner ring 2 is worked in a manner that a curvature radius R2 of the raceway 21 in given dimensional ranges A2 on both sides of an axial center 21a of the raceway is limited within the range of between ±1 μm to/from a mean curvature radius $R2_x$ of the raceway 21 in the dimensional ranges A2. Similarly to that of the outer ring 1, the predetermined dimensional range A2 is defined as a range covering at least 90% of a distance D2 between the axial center 21a of the raceway 21 and a raceway shoulder 21b, or a range covering at least 45% of a raceway width B2 with respect to the axial center 21a of the raceway 21. It is noted that since the raceway width B2 of the inner ring 2 is normally equal to the raceway width B1 of the outer ring 1, the dimensional range A2 for the inner ring is also equal to the dimensional range A1 for the outer ring 1.

By limiting the curvature radii R1, R2 of the raceways 11, 21 in the dimensional ranges A1, A2 within the ranges between ±1 μm to/from the mean curvature radii $R1_x$, $R2_x$, thereof, the ball bearings are prevented from suffering the product-by-product great variations in the natural frequency and the mean value thereof.

The reason for defining the dimensional ranges A1, A2 to cover at least 45% of the raceway widths B1, B2 of the raceways 11, 21 with respect to the axial centers thereof 11a, 21a is that consideration is given to that a contact point between the raceway 11, 21 of the outer ring 1 or the inner ring 2 and the ball 3 is positioned in a dimensional range between ±20 and ±40% of the raceway width B1, B2 with respect to the axial center 11a, 21a of the raceway 11, 21.

Figure 4:
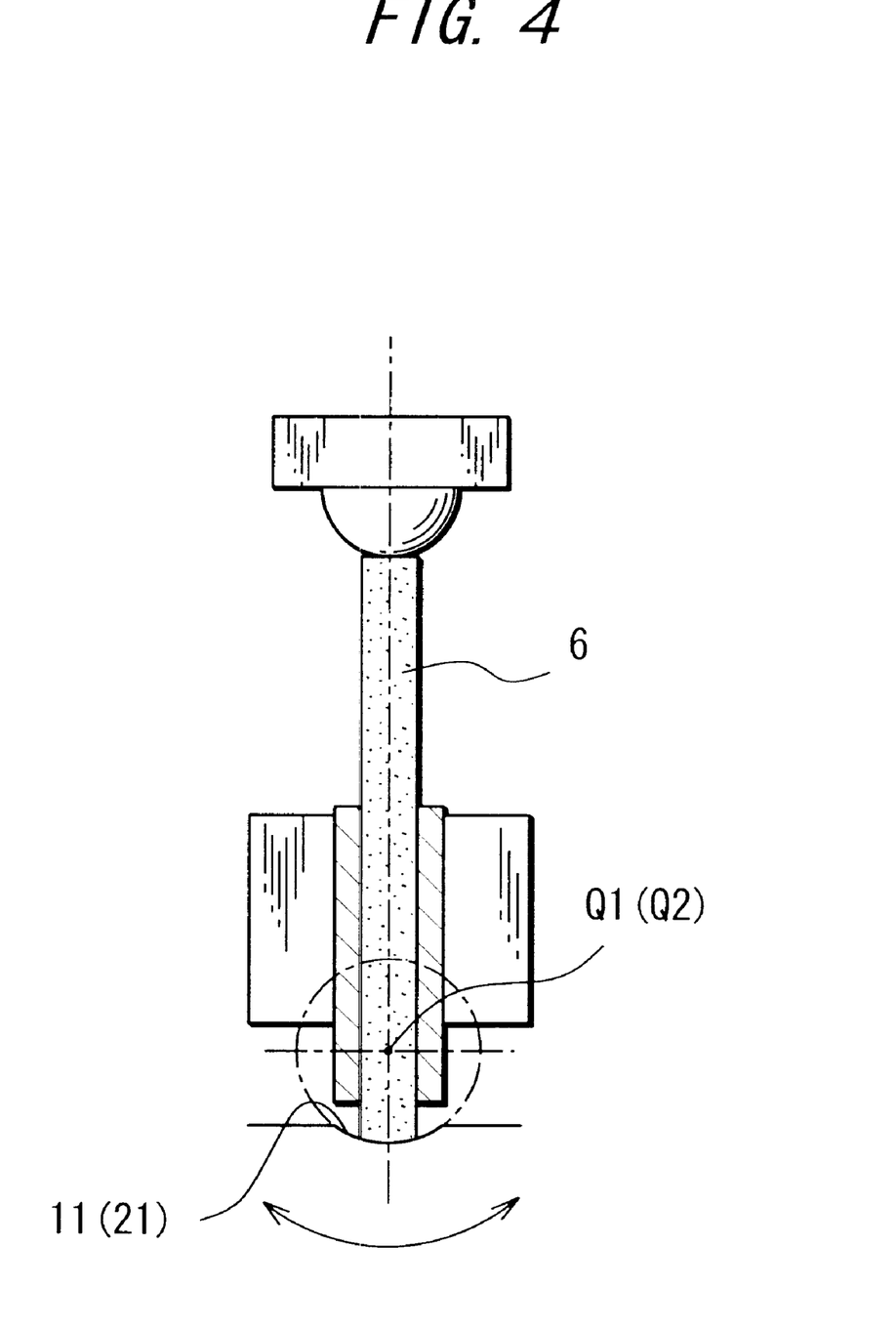
FIG. 4 is a schematic diagram showing a step of superfinishing the raceway of the inner or outer ring.

The raceways 11, 21 may be worked as follows to limit the curvature radii R1, R2 for the dimensional ranges A1, A2 within the range of between ±1 μm to/from the mean curvature radii $R1_x$, $R2_x$ thereof. That is, prior to subjecting the raceway 11, 21 to superfinishing, a pivot center Q1 of a superfinishing abrasive stone 6 is highly precisely matched with a center Q2 of the curvature radius of the raceway 11, 21 to be superfinished (see FIG. 4).

It is noted that the ball bearing of the invention may be particularly preferably applied not only to the rotary member of the spindle motor of the hard disc apparatus but also to the rotary member in a pivot section of a magnetic head for use in the hard disc apparatus.

EXAMPLE

Figure 5:
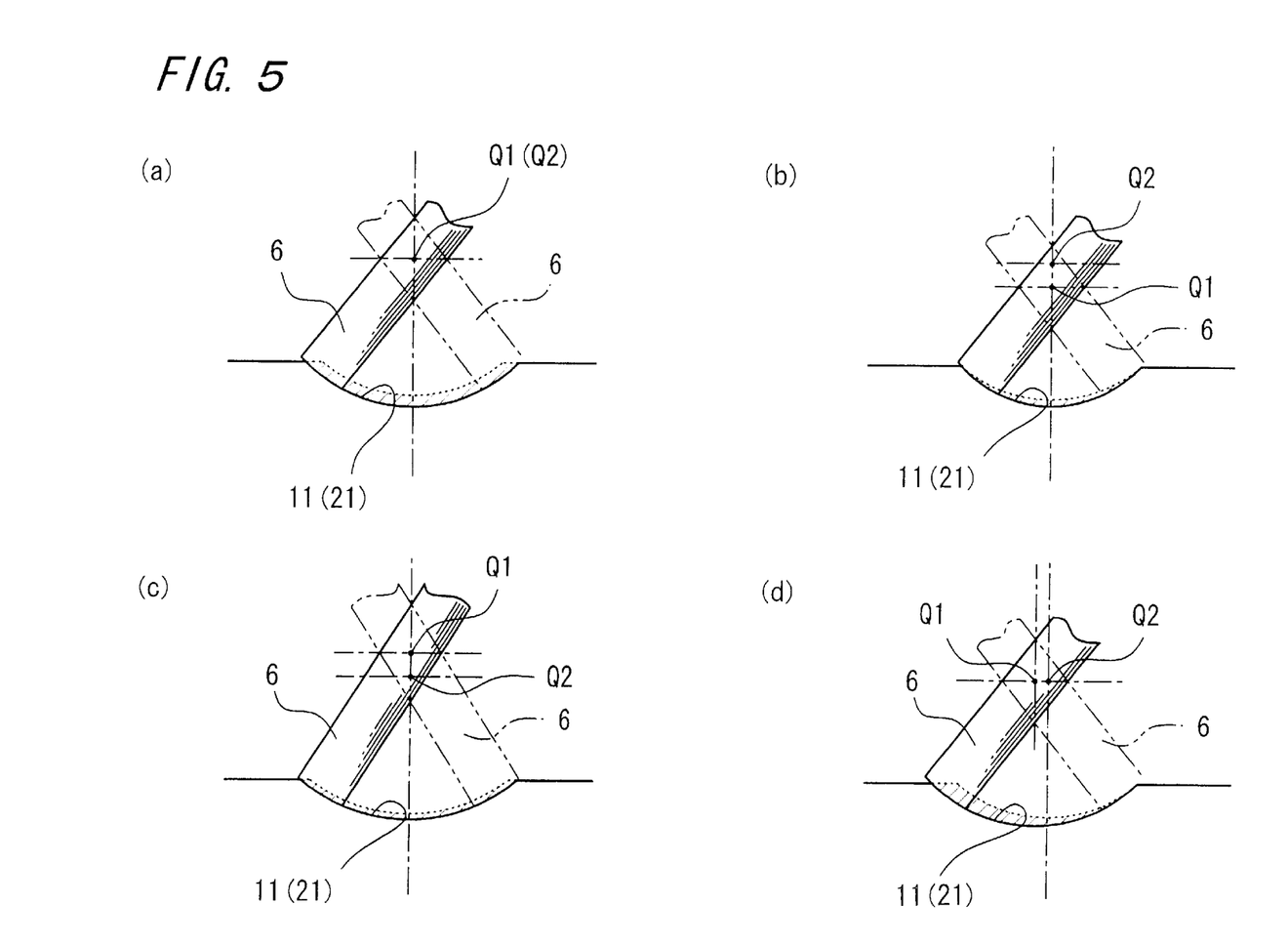
FIG. 5 is a group of schematic diagrams each showing a relation between the inner or outer ring and a superfinishing abrasive stone.

In an example hereof, an inner and outer ring were obtained by superfinishing the raceways thereof in a manner that a center Q2 of a curvature radius of the raceway of the inner or outer ring to be superfinished was set on an axis of the raceway and matched with the pivot center Q1 of the superfinishing abrasive stone 6 (see FIG. 5A). The resultant inner and outer rings were used to fabricate a ball bearing for the spindle motor of the hard disc apparatus (model No. 695, inside diameter: 5 mm, outside diameter: 13 mm, width: 4 mm).

Figure 6:
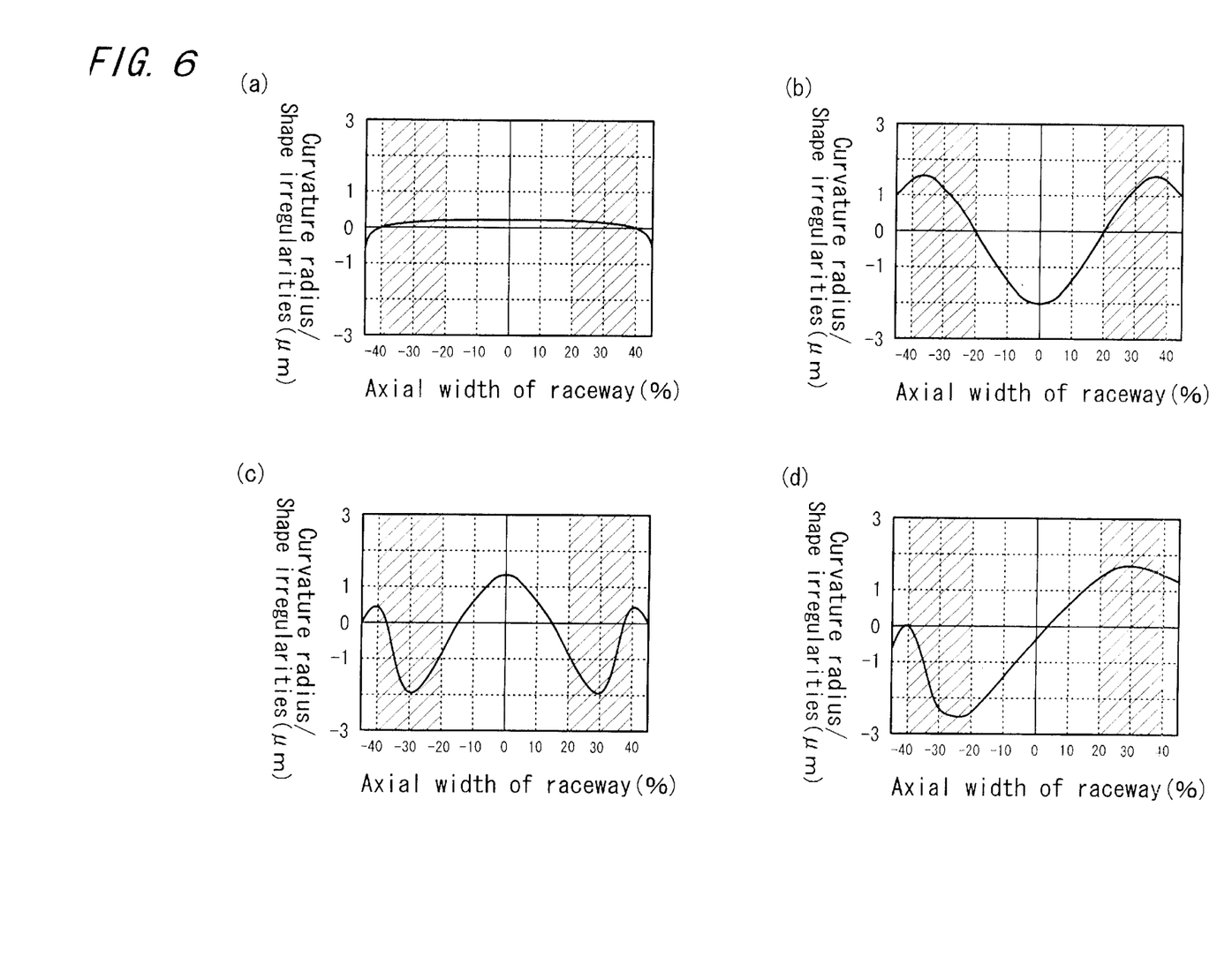
FIG. 6 is a group of graphs each showing measurement results of raceway configurations of the inner and outer rings.

Measurement was taken on the curvature radii of the raceways of the ball bearing thus fabricated. Within bounds on the both sides of the axial center of each of the raceways of the inner and outer rings, the curvature radius of a raceway portion in a dimensional range covering 45% of the raceway width with respect to the axial center was within the range of between ±1 μm to/from the mean curvature radius for the above dimensional range. It was thus confirmed that the raceways sustained little shape irregularities (see FIG. 6A). Incidentally, a raceway end was slightly recessed because the superfinishing abrasive stone was moved beyond the raceway shoulder. The same occurred in the following comparative examples hereof.

Comparative Example 1

In a comparative example 1, an inner and outer ring were obtained by superfinishing the raceways thereof in a manner that a center Q2 of a curvature radius of the raceway of the inner or outer ring to be superfinished was set on an axis of the raceway at place shifted from the pivot center Q1 of the superfinishing abrasive stone 6 in a direction away from the raceway (see FIG. 5B). The resultant inner and outer rings were used to fabricate a ball bearing having the same model number as that of the example.

Measurement was taken on the curvature radii of the raceways of the ball bearing thus fabricated. The raceway had a recessed shape at its central portion from which a greater mass was removed. It was confirmed that the curvature radius of the raceway portion in the above dimensional range was in the range of between +1.5 μm to the mean curvature radius of the raceway in the dimensional range and −2.0 μm therefrom, indicating the shape irregularities of the raceway (see FIG. 6B).

Comparative Example 2

In a comparative example 2, an inner and outer ring were obtained by superfinishing the raceways thereof in a manner that a center Q2 of a curvature radius of the raceway of the inner or outer ring to be superfinished was set on an axis of the raceway at place shifted from the pivot center Q1 of the superfinishing abrasive stone 6 in a direction toward the raceway (see FIG. 5C). The resultant inner and outer rings were used to fabricate a ball bearing having the same model number as that of the example.

Measurement was taken on the curvature radii of the raceways of the ball bearing thus fabricated. The raceway had a protruded shape at its central portion from which a smaller mass was removed, and recessed shapes at its end portions from which a greater mass was removed. It was confirmed that the curvature radius of the raceway portion in the above dimensional range was in the range of between +1.5 μm to the mean curvature radius of the raceway in the dimensional range and −1.8 μm therefrom, indicating the shape irregularities of the raceway (see FIG. 6C).

Comparative Example 3

In a comparative example 3, an inner and outer ring were obtained by superfinishing the raceways thereof in a manner that a center Q2 of a curvature radius of the raceway of the inner or outer ring to be superfinished was set at place on an axis of the raceway whereas the pivot center Q1 of the superfinishing abrasive stone 6 was displaced from the center Q2 in a widthwise direction of the raceway (see FIG. 5D). The resultant inner and outer rings were used to fabricate a ball bearing having the same model number as that of the example.

Measurement was taken on the curvature radii of the raceways of the ball bearing thus fabricated. The raceway had a protruded shape at one of the raceway shoulders from which a smaller mass was removed, and a recessed shape at the other raceway shoulder from which a greater mass was removed. It was confirmed that the curvature radius of the raceway portion in the above dimensional range was in the range of between +1.7 μm to the mean curvature radius of the raceway in the dimensional range and −2.4 μm therefrom, indicating the shape irregularities of the raceway (see FIG. 6D).

As the bearing of the comparative example 3, the following three types were fabricated by suitably reversing the lateral orientation, as seen in FIG. 1, of either of the inner and outer rings to be assembled together. A bearing of a comparative example 3A was assembled such that contact points of the balls under pre-load were positioned near the protrusions of the inner and outer rings. A bearing of a comparative example 3B was assembled such that the contact points of the balls under pre-load were positioned near the recesses of the inner and outer rings. A bearing of a comparative example 3C was assembled such that the contact points of the balls under pre-load were positioned near the protrusion of either one of the inner and outer rings and near the recess of the inner or outer ring.

Evaluation Experiment

Figure 7:
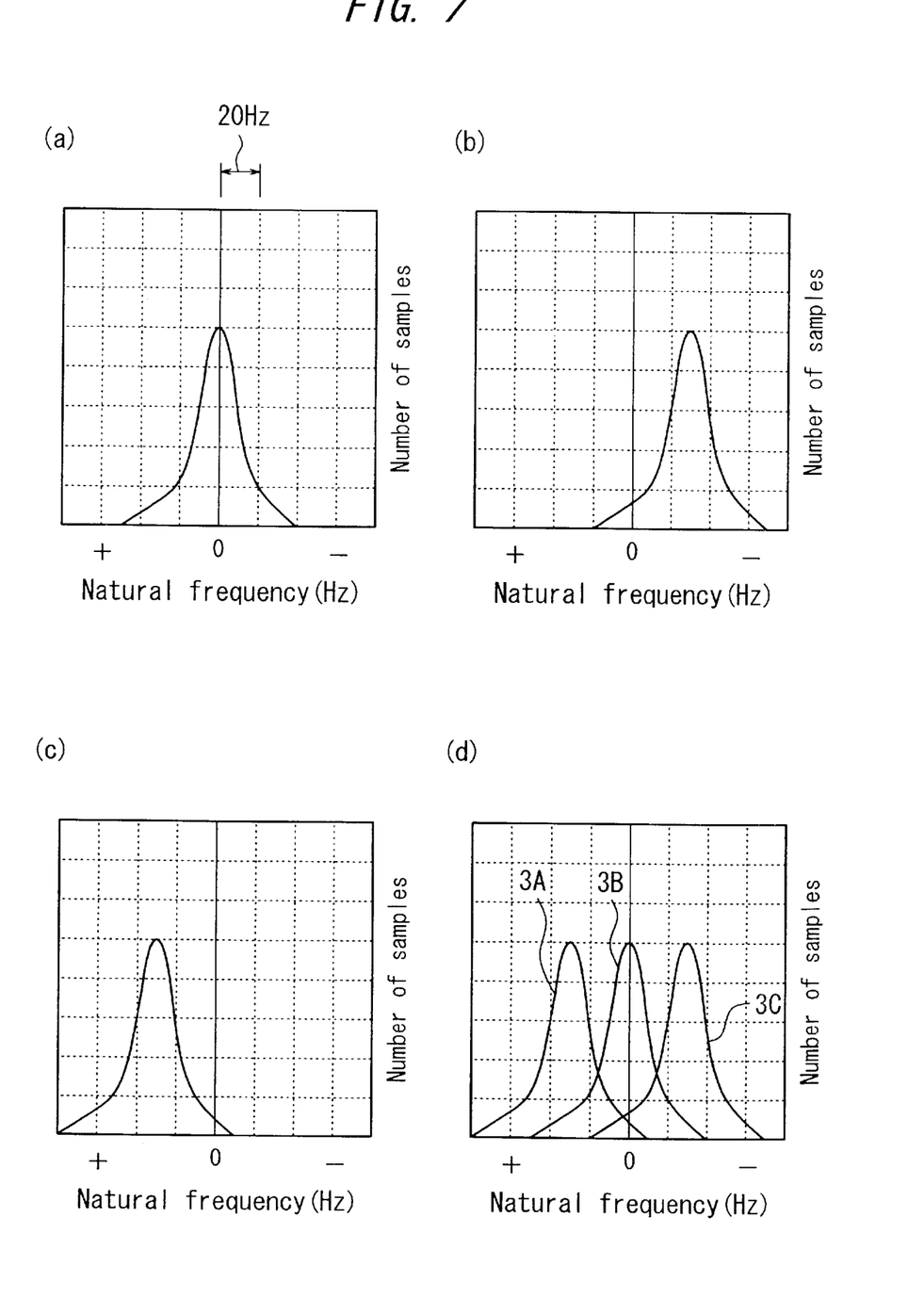
FIG. 7 is a group of graphs each showing measurement results of natural frequencies of ball bearings.

The ball bearings of the above example and comparative examples 1–3 were measured for the natural frequencies thereof. It is noted that 100 measurement samples were prepared for each of the examples. The results are shown in FIG. 7.

FIG. 7A shows that the bearings of the example have the natural frequencies at median (target value) with very little variations.

In contrast, the bearings of the comparative example 1 present a smaller mean value of the natural frequencies than those of the example, as shown in FIG. 7B. This is because the contact points of the balls in the bearing under pre-load are positioned near the protrusions of the raceways of the inner and outer rings so that a contact area between the balls and the raceways is reduced and the rigidity of the bearing is correspondingly decreased.

As seen from FIG. 7C, the bearings of the comparative example 2 present a greater mean value of the natural frequencies than those of the example. This is because the contact points of the balls in the bearing under pre-load are positioned near the recesses of the raceways of the inner and outer rings so that the contact area between the balls and the raceways is increased and the rigidity of the bearing is correspondingly increased. It is noted that the inner rings and outer rings of the comparative examples 1, 2 are products of the same lot, respectively and hence, have small variations in the natural frequency. In a case where the inner or outer rings are products of different lots, however, a need exists for factoring in variations between lots so that the variations in the natural frequency as a whole become greater.

As apparent from FIG. 7D, the bearings of the comparative example 3 are fluctuated in the mean value of the natural frequencies as compared with those of the example. Besides, the variations in the natural frequency is very great. This is because the contact points of the balls in the bearing under pre-load vary depending upon how the inner and outer rings are assembled together.

What is claimed is:

1. A ball bearing comprising:

an outer ring having a raceway;

an inner ring disposed in the outer ring in concentric relation therewith and having a raceway opposing the raceway of the outer ring; and a plurality of balls interposed between the raceway of the outer ring and the raceway of the inner ring, wherein within bounds on both sides of an axial center of each of the raceways of the outer and inner rings, a curvature radius of a raceway portion in a dimensional range covering at least 45% of a raceway width with respect to the axial center is within the range of between ±1 $\mu$m to/from a mean curvature radius of the raceway in the dimensional range.

2. The ball bearing as claimed in claim 1, wherein the ball bearing supports a hub of a spindle motor for a hard disc apparatus.

3. The ball bearing as claimed in claim 1, wherein the ball bearing supports a rotary member in a pivot section of a magnetic head assembly for a hard disc apparatus.

* * * * *